US009934794B1

(12) United States Patent
Lin et al.

(10) Patent No.: US 9,934,794 B1
(45) Date of Patent: Apr. 3, 2018

(54) WRITER HAVING A RECESSED TRAILING SHIELD AND NONMAGNETIC REFILL

(71) Applicant: Western Digital (Fremont), LLC, Fremont, CA (US)

(72) Inventors: Ran Lin, Madison, WI (US); Ming Sun, San Jose, CA (US); El-Amine Salhi, Fremont, CA (US); Donghong Li, Pleasanton, CA (US); Yunfei Li, Fremont, CA (US); Ming Jiang, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/019,062

(22) Filed: Feb. 9, 2016

(51) Int. Cl.
*G11B 5/31* (2006.01)
*G11B 5/17* (2006.01)
*G11B 5/60* (2006.01)

(52) U.S. Cl.
CPC .............. *G11B 5/3116* (2013.01); *G11B 5/17* (2013.01); *G11B 5/6005* (2013.01)

(58) Field of Classification Search
None
See application file for complete search history.

(56) References Cited

U.S. PATENT DOCUMENTS

| 5,634,259 A * | 6/1997 | Sone ..................... G11B 5/3103 29/603.12 |
| 5,822,153 A * | 10/1998 | Lairson .................. B82Y 10/00 360/234.7 |
| 6,466,401 B1 * | 10/2002 | Hong ..................... G11B 5/313 360/123.25 |
| 6,538,845 B1 * | 3/2003 | Watanabe .............. G11B 5/313 360/123.26 |
| 6,538,847 B2 * | 3/2003 | Meguro ................. B82Y 10/00 360/125.56 |
| 6,591,480 B1 * | 7/2003 | Chen ..................... G11B 5/3116 29/603.07 |
| 6,654,203 B2 * | 11/2003 | Yari ....................... G11B 5/313 360/125.56 |

(Continued)

FOREIGN PATENT DOCUMENTS

| JP | 03214478 A | * | 9/1991 |
| JP | 2003091802 A | * | 3/2003 |

OTHER PUBLICATIONS

Yi Zheng, et al., U.S. Appl. No. 14/311,233, filed Jun. 20, 2014, 36, pages.

*Primary Examiner* — Will J Klimowicz
(74) *Attorney, Agent, or Firm* — Foley & Lardner LLP

(57) ABSTRACT

A magnetic apparatus has a media-facing surface (MFS), a pole, a write gap at the MFS, a trailing shield, coil(s) and a nonmagnetic refill material. The pole includes a pole tip proximate to the MFS. The trailing shield includes a pedestal and a recessed portion. The pedestal occupies a portion of the MFS. The recessed portion has a front surface at an acute angle from the MFS and is recessed from the MFS by a distance of not more than 0.8 micrometers. The write gap is between the pedestal and the pole tip. The coil(s) energize the pole and have at least one turn. The coil(s) are between the recessed portion of the trailing shield and the pole. The trailing shield is between the nonmagnetic refill material and the pole. A portion of the nonmagnetic refill material is between the recessed portion and the MFS.

20 Claims, 4 Drawing Sheets

(56) References Cited

U.S. PATENT DOCUMENTS

| | | | |
|---|---|---|---|
| 6,657,820 B2* | 12/2003 | Kohira | G11B 5/6005 360/235.7 |
| 6,778,356 B2* | 8/2004 | Kawai | G11B 5/312 360/119.11 |
| 6,793,961 B2 | 9/2004 | Nikitin et al. | |
| 6,801,393 B2* | 10/2004 | Oki | G11B 5/3143 360/123.26 |
| 6,947,259 B2* | 9/2005 | Miyazaki | G11B 5/60 360/234.7 |
| 7,002,778 B2* | 2/2006 | Yazawa | B82Y 10/00 360/123.47 |
| 7,037,421 B2* | 5/2006 | Kanada | G11B 5/3133 205/104 |
| 7,289,296 B2* | 10/2007 | Kanada | G11B 5/3133 205/258 |
| 7,520,048 B2* | 4/2009 | Gao | G11B 5/3106 216/62 |
| 7,596,855 B2 | 10/2009 | Matono | |
| 8,289,649 B2 | 10/2012 | Sasaki et al. | |
| 8,947,828 B1* | 2/2015 | Hsiao | G11B 5/3116 29/603.16 |
| 2004/0032692 A1* | 2/2004 | Kobayashi | G11B 5/012 360/125.13 |
| 2005/0168870 A1* | 8/2005 | Sato | G11B 5/3116 360/125.62 |
| 2007/0242393 A1* | 10/2007 | Gao | G11B 5/3106 360/324 |
| 2008/0266720 A1 | 10/2008 | Yazawa et al. | |
| 2012/0140358 A1* | 6/2012 | Sasaki | G11B 5/1278 360/122 |
| 2013/0242431 A1 | 9/2013 | Hosomi et al. | |

* cited by examiner

WRITER HAVING A RECESSED TRAILING SHIELD AND NONMAGNETIC REFILL

BACKGROUND

FIG. 1 depicts a side view of a conventional magnetic recording apparatus 10. The magnetic recording apparatus 10 may be a perpendicular magnetic recording (PMR) apparatus. The conventional magnetic recording apparatus 10 includes a read apparatus 12 and a write apparatus 20. The conventional read apparatus 12 includes shields 14 and 18 and sensor 16. The read sensor 16 is typically a giant magnetoresistive (GMR) sensor or tunneling magnetoresistive (TMR) sensor. The write apparatus 20 includes a leading shield 22, coils 24 and 32, back gap 26, auxiliary poles 28, main pole 30 and trailing shield 34. Although not shown, the pole 30 may have leading and/or trailing edge bevels. In such cases, the pole 30 is shortest in the down track direction at the ABS. Side shields (not shown) may also be included in the conventional write apparatus 20.

Although the conventional magnetic recording head 10 functions, there are drawbacks. In particular, the conventional magnetic recording head 10 may not perform sufficiently at higher recording densities. For example, as recording areal density approaches 1 Tb/in$^2$ and above, issues with wide area track erasure (WATEr) may be present for the conventional write apparatus 20. For example, the trailing shield 34 may not adequately function to preclude writing of distant tracks. Further, the field strength and profile of the main pole 30 are also desired to be managed for sufficient signal to noise ratio (SNR) and reverse overwrite (ReOVW). These characteristics may be affected by not only the pole 30 but also the leading shield 22, trailing shield 34 and side shields (not shown). Accordingly, what is needed is a system and method for improving the performance of a magnetic recording head, particularly at higher areal densities.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
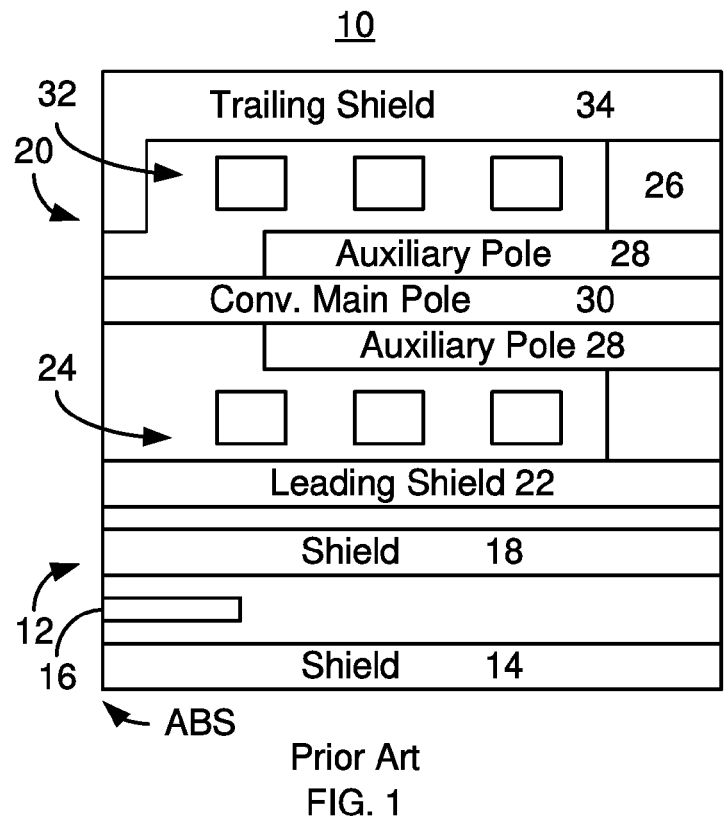
FIG. 1 depicts a side view of a conventional magnetic recording apparatus.
Figure 2:
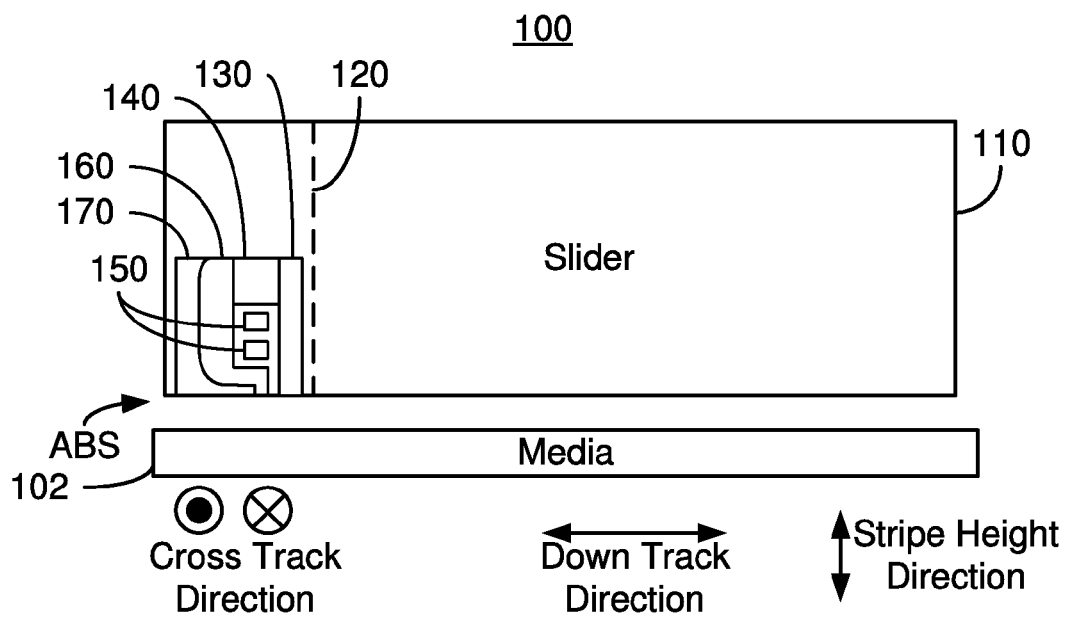
FIG. 2 depicts an exemplary embodiment of a data storage device.
Figure 3:
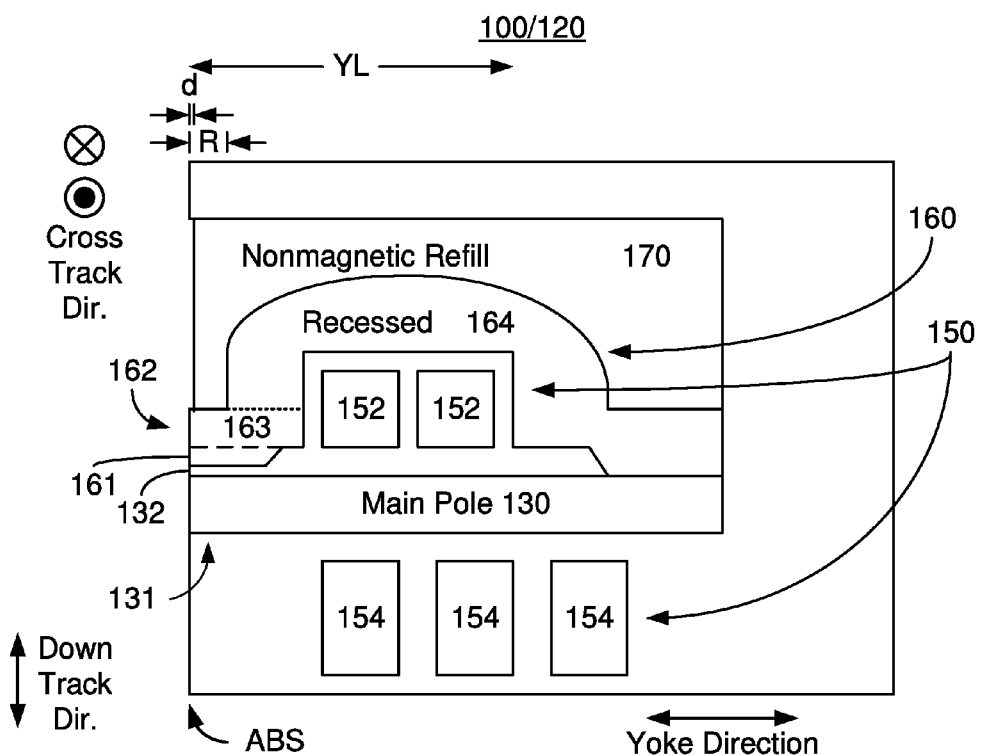
FIG. 3 depicts a side view of an exemplary embodiment of a magnetic recording write apparatus.

FIG. 2 depicts a side view of an exemplary embodiment of a portion of a data storage device 100 including a write apparatus 120. In the embodiment shown, the data storage device 100 is a disk drive. FIG. 3 depicts a close-up side view of an exemplary embodiment of the data storage device 100/write apparatus 120. For clarity, FIGS. 2-3 are not to scale. Referring to FIGS. 2-3, for simplicity not all portions of the disk drive 100 are shown. In addition, although the disk drive 100 is depicted in the context of particular components other and/or different components may be used. For example, circuitry used to drive and control various portions of the data storage device 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The data storage device 100 includes media 102, a slider 110 and the write apparatus 120. Additional and/or different components may be included in the data storage device 100. Although not shown, the slider 110 and thus the write apparatus 120 are generally attached to a suspension (not shown). The write apparatus 120 is fabricated on the slider 110 and includes a media-facing surface (MFS) proximate to the media 102 during use. In the embodiment shown, the MFS is an air-bearing surface (ABS). In general, the disk drive 100 includes a write apparatus 120 and a read apparatus. However, for clarity, only the write apparatus 120 is shown.

The write apparatus 120 includes a pole 130, a trailing shield 160, write gap 132 and coil(s) 150. The trailing shield 160 is coupled with the pole 130. A back gap may be considered to be formed in this region. In other embodiments, different and/or additional components may be used in the write apparatus 120. For example, the write apparatus 120 might include a leading shield, auxiliary pole(s) and/or other features.

The coil(s) 150 are used to energize the pole 130 for writing and include turns 152 and 154. Thus, two turns 152 are between the pole 130 and the trailing shield 160. Three turns 154 are shown on the opposite side of the pole 130. In other embodiments, another number of turns may be used. Although termed separate turns, the turns 152 and 154 may be connected. For example, the coil(s) 150 may be a helical coil. In such a case, a turn 152 and a turn 154 directly below may be part of the same turn. If the coil(s) 150 are spiral coil(s), then the turns 152 may form a separate coil from the turns 154. Thus, as used herein, a "turn" of a coil may be the portion of the turn depicted in the drawing. In addition, although not shown, it is possible for the write apparatus 120 to have coil turns that are far from the ABS and not depicted in the drawings. Finally, in some embodiments, the turns 154 might be omitted.

The pole 130 includes a pole tip 131 in proximity to the ABS. The pole tip 131 is shown as occupying a portion of the ABS. However, in other embodiments, the pole tip 131 might be recessed from the ABS. In the embodiment shown, the leading and trailing surfaces of the pole tip 131 are substantially perpendicular to the ABS. However, in other embodiments, the pole 130 may have a leading and/or a trailing edge bevel (surface at an acute angle to the ABS). The write gap 132 separates the pole tip 131 from a portion 162 of the trailing shield 160.

The trailing shield 160 includes a pedestal portion 162 and a recessed portion 164. The pedestal portion 162 occupies a portion of the ABS. In the embodiment shown, the pedestal portion 162 includes a bottom portion 161 and a top portion 163. The bottom portion 161 is shown as not extending as far from the ABS as the top portion 163. The back surface of the bottom portion 161 is also shown as being at a nonzero angle from the ABS. In other embodiments, the bottom portion 161 may extend as far as or farther from the ABS than the top portion 163. The back surface of the bottom portion 161 may also be at a different angle from the ABS. The bottom portion 161 may have the same saturation magnetization as the top portion 163. In other embodiments, the portions 161 and 163 of the pedestal 162 have different saturation magnetizations. The bottom portion 161 may have a higher saturation magnetization than the top portion 163. For example, the saturation magnetization of the bottom portion 161 may be 2.0 T while the saturation magnetization of the top portion 163 may be 1.6 T. The portions 161 and 163 may be fabricated separated. Not only might the portions 161 and 163 have different saturation magnetizations, they may have different geometries. For example, the bottom portion 161 may be thinner than the top portions 163, or vice versa. In some embodiments, the top portion 163 has a nominal thickness of 0.8 micron. Although considered part of the pedestal 162, the top portion 163 and the recessed portion 164 may be formed from a single layer, for example a layer of NiFe. In such an embodiment, the top portion 163 of the pedestal 162 and the recessed portion 164 of the trailing shield 160 may have substantially the same saturation magnetization.

The recessed portion 164 has a front surface at an acute angle from the ABS. In the embodiment shown in FIG. 3, the front surface is substantially parallel to the ABS (at a zero angle from) and is recessed from the ABS by a distance, R. This distance R is greater than zero and not more than 0.8 micrometers. In some embodiments, R is at least 0.2 micrometers and not more than 0.6 micrometers. For example, in some embodiments, R is nominally 0.4 micrometers. In some embodiments, the minimum target (desired/design) value for R is the processing tolerance for fabrication of the trailing shield 160. Setting the target value for R at greater than the processing variation ensures that the front surface of the recessed portion 164 is recessed from the ABS.

The magnetic write apparatus 120 also includes a nonmagnetic refill layer 170. Although termed "a material", multiple elements, layers or other substructures might be included in the nonmagnetic refill layer 170. Alternatively, the nonmagnetic refill layer 170 may include a single element or alloy. For example, the nonmagnetic refill layer 170 may include at least one of NiP and aluminum oxide. In some such embodiments, the nonmagnetic refill material 170 consists of nonmagnetic NiP. A portion of the nonmagnetic refill material 170 resides between the recessed portion 164 of the trailing shield 160 and the ABS. Both part of the nonmagnetic refill material 170 and part of the pedestal 162 reside at the ABS.

The material(s) selected for the nonmagnetic refill material 170 may have some characteristics that are similar to those of the shield 160. In order to ensure that the ABS is substantially planar, the nonmagnetic refill material 170 may be selected such that the lapping rate of at least the portions 163 and 164 of the trailing shield 160 and the nonmagnetic refill material 170 are substantially the same. Stated differently, at least part of the trailing shield 160 laps at substantially the same rate as the nonmagnetic refill material 170 when exposed to the same lapping conditions. In some embodiments, for example, the NiP nonmagnetic refill material 170 may have substantially the same lapping rate as NiFe used for the shield 160. This similarity of lapping rates results in little to no difference in the position of the ABS for the trailing shield 160 and the nonmagnetic refill layer 170. The difference, d, in the location of the nonmagnetic refill material 170 at the ABS is not more than 5 nm in the yoke direction from the ABS for the trailing shield 160. In other words, the nonmagnetic refill material 170 is recessed by not more than five nanometers from the plane defined by the portion of the ABS formed by the pedestal 162. In some such embodiments, d is less than 4 nm. In some embodiments, the nonmagnetic refill material 170 is desired to have a similar conductivity to the shield 160. For example, the conductivities of nonmagnetic NiP and NiFe used in the nonmagnetic refill material 170 and the shield 160, respectively, may be sufficiently similar.

In operation, current is driven through the coil(s) 150 to energize the pole 130. The field for the pole 130 may be concentrated near the pole tip 131 and used to write to the media 102. The presence of the trailing shield 160 having a recessed portion 164 may have reduced flux leakage. Thus, the WATEr for the magnetic write apparatus 120/data storage device 100 may be improved.

The magnetic disk drive 100 may exhibit improved performance. As discussed above, the WATEr for the write apparatus 120 may be improved. This may be achieved substantially without adversely affecting write characteristics such as ReOVW and SNR. Thus, performance of the data storage device 100 may be improved. These benefits may be obtained without complicating fabrication of the write apparatus 120.

Figure 4A:
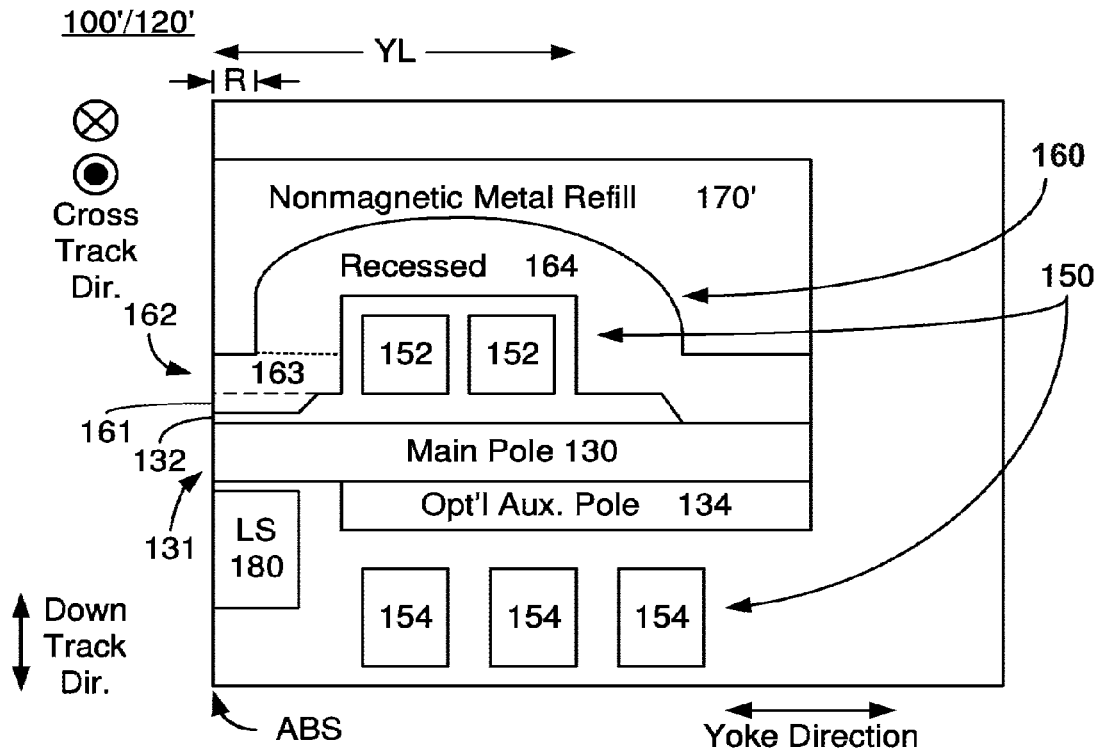
FIGS. 4A and 4B depict side and ABS views of another exemplary embodiment of a magnetic recording write apparatus.
Figure 4B:
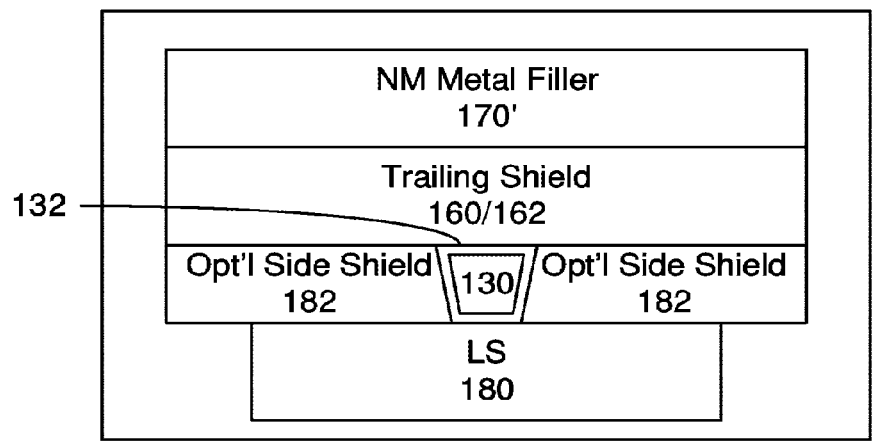

FIGS. 4A and 4B depict side and ABS views of an exemplary embodiment of a magnetic data storage device 100'. More specifically, a portion of the write apparatus 120' 100'. More specifically, a portion of the write apparatus 120' is depicted. For simplicity, only a portion of the magnetic write apparatus 120' is shown. FIGS. 4A-4B are not to scale for clarity. The data storage device 100' is analogous to the data storage device 100. Consequently, analogous components have similar labels. The write apparatus 120' may reside on a slider (not shown) and include a pole 130, a write gap 132, coil(s) 150, a trailing shield 160 and nonmagnetic metal refill material 170' analogous to the pole 130, write gap 132, coil(s) 150, trailing shield 160 and nonmagnetic refill material 170, respectively, depicted in FIGS. 2-3.

The pole 130 includes a pole tip 131 that is analogous to the pole tip 131 of FIGS. 2-3. Similarly, the trailing shield 160 includes a pedestal portion 162, which includes portions 161 and 163, and a recessed portion 164 analogous to the pedestal portion 162 including portions 161 and 163, and recessed portion 164, respectively, of FIGS. 2-3. The recessed portion 164 is still recessed a distance R from the ABS. In the embodiment shown, the ABS for the pedestal 162 and the nonmagnetic metal refill material 170' are not offset. Stated differently, d is zero for the magnetic write apparatus 120'. In other embodiments, d may be nonzero and in the range described above. The coil(s) 150 include turns 152 and 154 analogous to those of FIGS. 2-3.

In the embodiment shown in FIGS. 4A-4B, the component 170' is explicitly metallic. For example, nonmagnetic metal refill material 170' may include a metallic element or alloy such as nonmagnetic NiP. In other embodiments, the component 170' might be an insulator such as aluminum oxide. Further, a leading shield 180 and optional side shields 182 are shown. Although the gap 132 is shown as a single item, the side gap and/or bottom gap may be formed separately. Thus, the bottom gap (between the pole 130 and the leading shield 180), the side gaps (between the pole 130 and the optional side shields 182) and write gap (between the pole 130 and trailing shield 160) may be separately formed, may have different thicknesses and/or may be made of different materials. The magnetic write apparatus 120' may also include one or more auxiliary poles. In the embodiment shown in FIGS. 4A-4B, a single auxiliary pole 134 on the leading side of the pole 130 is shown. In some other embodiments, the auxiliary pole 134 may be located on the trailing side of the pole 130. In still other embodiments, an auxiliary pole 134 on the leading side of the main pole 130 and another auxiliary pole (not shown) on the trailing side of the main pole 130 may be present.

The magnetic write apparatus 120' may share the benefits of the magnetic write apparatus 120. For example, the WATEr may be improved substantially without sacrificing other aspects of performance. In addition, fabrication and performance of the write apparatus 120' may be further improved through the use of a metallic nonmagnetic metal refill material 170'. Because the nonmagnetic metal refill material 170' is conductive, it may be plated. Thus, the nonmagnetic metal refill material 170' may only grow on the conductive trailing shield 160. Consequently, the nonmagnetic metal refill material 170' may be self-aligned to the trailing shield 160. Thus, as can be seen in FIG. 4B, the structure 170' is directly above the trailing shield 160/162. Fabrication of the refill materials 170' may be simplified because removal of excess materials in the cross track direction from the pedestal 162 may not be required. Thus, performance and fabrication of the magnetic write apparatus 120' may be improved.

Figure 5:
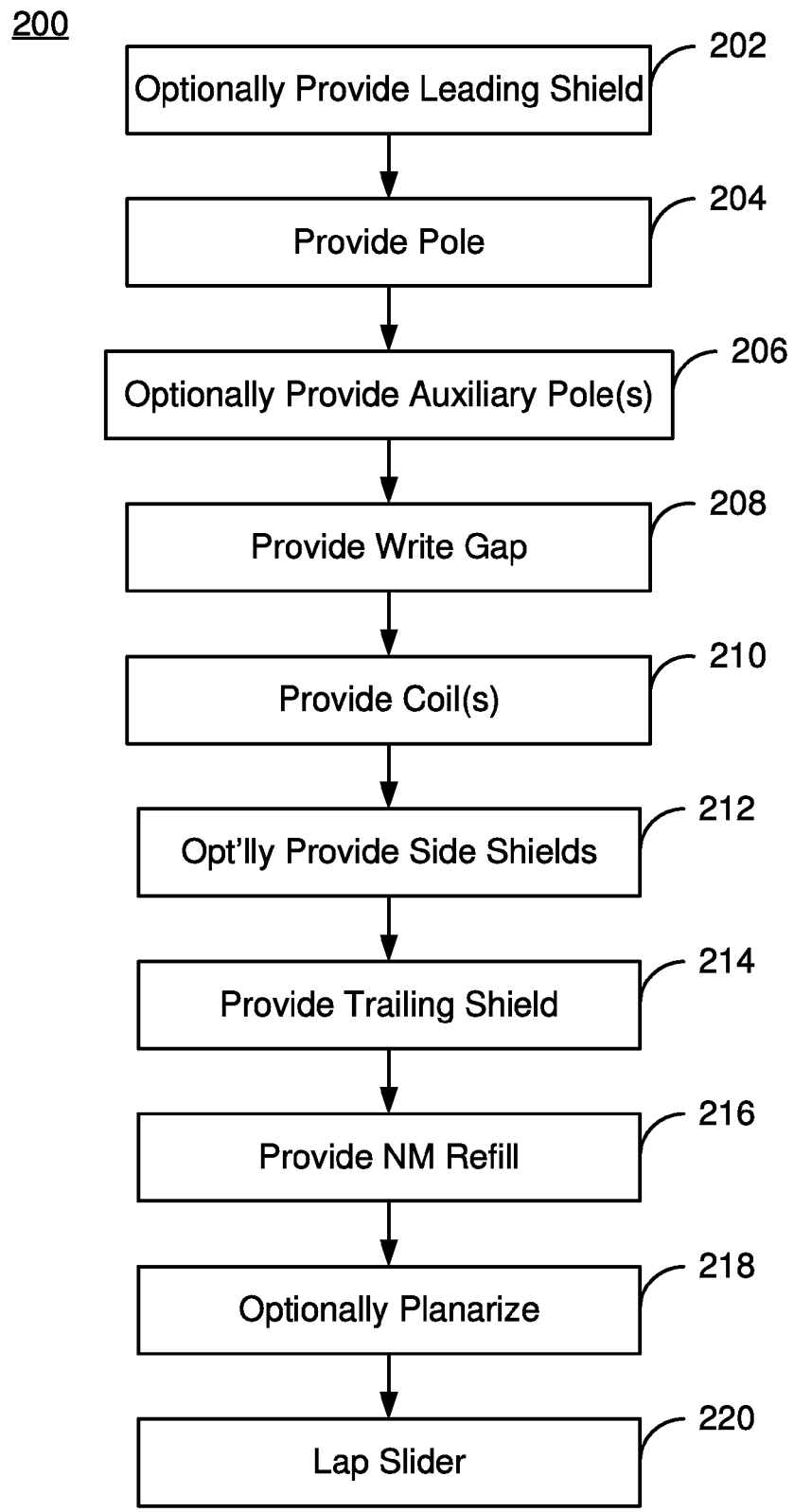
FIG. 5 is flow chart depicting an exemplary embodiment of a method for fabricating a magnetic write apparatus.

FIG. 5 depicts an exemplary embodiment of a method 200 for providing a magnetic recording apparatus. For simplicity, some steps may be omitted, interleaved, combined, performed in another order and/or include substeps. The method 200 is also described in the context of providing a magnetic write apparatus 120' depicted in FIGS. 4A and 4B. The method 200 may also be used to fabricate other magnetic recording apparatuses including but not limited to the magnetic write apparatus 120. The method 200 may be used to fabricate multiple magnetic recording heads at substantially the same time. The method 200 is also described in the context of particular layers. A particular layer may include multiple materials and/or multiple sub-layers. The method 200 also may start after formation of other portions of the magnetic recording apparatus. For example, the method 200 may start after a read apparatus, return pole/shield and/or other structure(s) have been fabricated.

Referring to FIGS. 4A-4B and 5, the leading shield 180 may optionally be provided, via step 202. In some embodiments, the leading shield 180 may be omitted. The pole 130 is provided, via step 204. Step 204 may include using a damascene process. For example, a trench may be formed in a layer and the material(s) for the pole 130 deposited and patterned. One or more ferromagnetic materials are deposited. The pole tip 131 and other components of the pole 130 may be formed. Other methods may also be used to form the pole 130 including but not limited to full film deposition of magnetic materials and removal for example via milling and/or lapping. One or more auxiliary pole(s) 134 may optionally be provided via step 206. At least part of step 206 may be performed before step 204, for example if the auxiliary pole 134 is on the leading side of the pole 130.

The write gap 132 may be provided, via step 208. The coil(s) 150 are provided, via step 210. Portions of step 210 may thus be interleaved with the remaining steps of the method 200. For example, the turns 154 may be provided before the formation of the pole 130. However, the other turns 152 of the coil(s) 150 may be provided after the pole 130 has been formed. Step 210 may also include depositing and patterning the material(s) used for the coil(s) 150. Step 210 may include forming helical coil(s) formed of the coils 150. Alternatively, one or two spiral coils may be formed using turns 152 and 154.

The side shields 182 may optionally be provided, via step 212. The trailing shield 160 is provided, via step 214. The pedestal 162 and recessed portion 164 may thus be fabricated. In some embodiments, step 214 includes providing the bottom portion 161 of the pedestal 162 first. In some such embodiments, the bottom portion 161 of the pedestal is fabricated as part of the side shields in step 212. Thus, the bottom portion 161 of the pedestal 162 may have the same saturation magnetization as the side shields 182. In other embodiments, the bottom portion 161 may be fabricated separately. The top portion 163 of the pedestal 164 may be fabricated with the recessed portion 164. For example, a single layer of magnetic material may be deposited and patterned to form portions 163 and 164. However, in other embodiments, the top portion 163 of the pedestal 162 and the recessed portion 164 may be formed separately.

The nonmagnetic refill material 170' is provided, via step 216. In some embodiments, step 216 includes plating a nonmagnetic metal refill material, such as NiP. Thus, the nonmagnetic metal refill material may, therefore, be self-aligned. The portion of the write apparatus 120' formed may then be planarized, via step 218. Fabrication of the remaining components may also be completed.

The slider/magnetic write apparatus 120' may then be lapped, via step 220. Because the lapping rate of the shield 160 (or at least part of the pedestal 162) is substantially the same as that of the nonmagnetic refill material 170', the ABS is substantially flat. Stated differently, the difference in the ABS for the shield pedestal 162 and the nonmagnetic refill material 170' is not more than 5 nm. In some embodiments, the difference is not more than 4 nm.

Using the method 200, the magnetic write apparatuses 120 and/or 120' may be provided. Thus, the benefits of the magnetic apparatuses 120 and/or 120' may be achieved.

What is claimed is:

1. A magnetic write apparatus having a media-facing surface (MFS), the magnetic write apparatus comprising:
    a pole;
    a write gap at the MFS positioned directly over the pole;
    a trailing shield comprising a pedestal portion and a recessed portion, the pedestal portion occupying a portion of the MFS and further comprising a bottom portion directly over the write gap and a top portion directly over the bottom portion, wherein a saturation magnetization of the bottom portion is greater than a saturation magnetization of the top portion, wherein the top portion and the bottom portion extend to the MFS, the recessed portion having a front surface recessed from the MFS, wherein the bottom portion further comprises a first portion extending from and perpendicular to the MFS and a back surface recessed from the MFS and at an angle with a plane extending parallel to the MFS;
    at least one coil for energizing the pole, the at least one coil between the recessed portion of the trailing shield and the pole, wherein the bottom portion does not extend over the at least one coil; and
    a nonmagnetic refill material, the trailing shield being between the nonmagnetic refill material and the pole, a portion of the nonmagnetic refill material being between the recessed portion and the MFS.

2. The magnetic write apparatus of claim 1 wherein the trailing shield has a first lapping rate, the nonmagnetic refill material has a second lapping rate and the first lapping rate is substantially equal to the second lapping rate.

3. The magnetic write apparatus of claim 1 wherein the portion of the nonmagnetic refill material that is between the recessed portion and the MFS is recessed from the MFS.

4. The magnetic write apparatus of claim 3, wherein the nonmagnetic refill material that is between the recessed portion and the MFS is recessed from the MFS by no more than five nanometers.

5. The magnetic write apparatus of claim 1 wherein the portion of the nonmagnetic refill material that is between the recessed portion and the MFS occupies a portion of the WS.

6. The magnetic write apparatus of claim 1 wherein the front surface of the recessed portion forms an acute angle with a plane extending parallel to the MFS.

7. The magnetic write apparatus of claim 1 wherein the front surface of the recessed portion is substantially parallel to the MFS.

8. The magnetic write apparatus of claim 1, wherein the bottom portion of the pedestal portion has a thickness in a down track direction that is less than a thickness of the top portion in the down track direction.

9. The magnetic write apparatus of claim 1, wherein the top portion extends farther away from the MFS than the bottom portion.

10. The magnetic write apparatus of claim 9, wherein part of the top portion that extends farther away from the bottom portion is separated from the pole by the write gap only.

11. The magnetic write apparatus of claim 1, wherein the top portion has a nominal thickness of 0.8 microns.

12. The magnetic write apparatus of claim 1, wherein the saturation magnetization of the bottom portion is 2.0T and the saturation magnetization of the top portion is 1.6T.

13. The magnetic write apparatus of claim 1, further comprising an auxiliary pole on a leading side of the pole and recessed from the MFS, and wherein a back surface of the pole and a back surface of the auxiliary pole are at substantially same distance from the MFS.

14. The magnetic write apparatus of claim 1, wherein the front surface of the recessed portion is recessed from the MFS by at least 0.2 micrometers and not more than 0.6 micrometers.

15. A data storage device comprising:
a media; and
a slider having a media-facing surface (MFS), the slider comprising a pole, a write gap positioned directly over the pole, a trailing shield, at least one coil, and a nonmagnetic refill material, the trailing shield comprising a pedestal portion and a recessed portion, the pedestal portion occupying a portion of the MFS and further comprising a bottom portion directly over the write gap and a top portion directly over the bottom portion, wherein a saturation magnetization of the bottom portion is greater than a saturation magnetization of the top portion, wherein the top portion and the bottom portion extend to the MFS, the recessed portion having a front surface recessed from the MFS, the at least one coil for energizing the pole and located between the recessed portion of the trailing shield and the pole, wherein the bottom portion does not extend over the at least one coil and comprises a first portion extending from and perpendicular to the MFS and a back surface recessed from the MFS and at an angle with a plane extending parallel to the MFS, the trailing shield being between the nonmagnetic refill material and the pole, a portion of the nonmagnetic refill material being between the recessed portion and the MFS.

16. The data storage device of claim 15 wherein the trailing shield has a first lapping rate, the nonmagnetic refill material has a second lapping rate and the first lapping rate is substantially equal to the second lapping rate.

17. The data storage device of claim 15 wherein the nonmagnetic refill material is a nonmagnetic metal.

18. The data storage device of claim 17 wherein the nonmagnetic metal is NiP.

19. The data storage device of claim 15 wherein the nonmagnetic refill material is aluminum oxide.

20. The data storage device of claim 15 wherein the front surface of the recessed portion forms an acute angle with a plane extending parallel to the MFS.

* * * * *